United States Patent
Dupaquis et al.

(10) Patent No.: US 8,006,045 B2
(45) Date of Patent: Aug. 23, 2011

(54) DUMMY WRITE OPERATIONS

(75) Inventors: Vincent Dupaquis, Biver (FR); Patrick Debaenst, Roquevaire (FR)

(73) Assignee: Atmel Rousset S.A.S., Rousset (FR)

( * ) Notice: Subject to any disclaimer, the term of this patent is extended or adjusted under 35 U.S.C. 154(b) by 337 days.

(21) Appl. No.: 12/395,572

(22) Filed: Feb. 27, 2009

(65) Prior Publication Data

US 2010/0223434 A1    Sep. 2, 2010

(51) Int. Cl.
*G06F 12/00* (2006.01)
(52) U.S. Cl. ....................................... 711/154
(58) Field of Classification Search .......................... None
See application file for complete search history.

(56) References Cited

U.S. PATENT DOCUMENTS 7,206,907 B2 * 4/2007 Poulton et al. ................ 711/154
7,301,831 B2 * 11/2007 Ware .............................. 365/194

* cited by examiner

*Primary Examiner* — Hiep T Nguyen
(74) *Attorney, Agent, or Firm* — Fish & Richardson P.C.

(57) ABSTRACT

A dummy write operation is disclosed that mimics an actual write operation to a memory array. In some implementations, a dummy write operation mimics an actual write operation by starting a charge pump, selecting a correct data line in the memory array, and by following the sequencing of an actual write operation. By mimicking an actual write operation, an attacker cannot use power analysis to distinguish between dummy and actual write operations. For example, PIN comparison operations would present the same or substantially the same power trace for both positive and negative comparisons, making it difficult for an attacker to determine if a retry count was written to NVM.

9 Claims, 3 Drawing Sheets

DUMMY WRITE OPERATIONS

TECHNICAL FIELD

This subject matter relates generally to security mechanisms for smart cards.

BACKGROUND

A smart card, chip card, or integrated circuit card (ICC), is a pocket-sized card with embedded integrated circuits, which can process data. Some smart cards contain only non-volatile memory (NVM) storage components and security logic. Other smart cards contain volatile memory and microprocessor components. Smart cards are often used as a form of security authentication for various applications, and thus store and operate on secret data. Smart cards are subject to various attacks, usually in an effort to obtain the secret data stored in the smart card.

One kind of attack relates to mechanisms where data are sent to the smart card and compared in the card with corresponding values or reference data, with a retry counter being incremented according to the result of the comparison. For example, a Personal Identification Number (PIN) may be compared to a corresponding PIN stored in the card, and a retry counter can be incremented for negative comparisons. The attack works, for example, by measuring a voltage drop across a resistor in a power supply lead. If a suitable command containing the comparison data is sent to the smart card, it is possible to see from the voltage measurement whether the retry counter has been incremented, even before a return code has been received. If the return code is sent before the retry counter is written to memory when the result of the comparison is positive, this method can be used to determine the value of the reference data. This is done by sending all possible variations of the comparison value to the smart card, and cutting off power to the card before the retry counter has been incremented, if the result is negative. A positive result can be recognized from the associated return code, which is sent before the retry counter is written to memory.

One defense is to always increment the retry counter before making the comparison, and then decrementing the counter afterwards. In this case, the attacker cannot obtain an advantage, regardless of when he interrupts power to the card, since the retry counter will have already been incremented. In a second approach, the retry counter is incremented after a negative comparison and written to an unused non-volatile memory cell after a positive comparison. Both of these write accesses occur at the same time in the process, so the attacker can draw no conclusions with regard to the result of the comparison. The attacker learns the result of the comparison only after receiving the return code, and at this point it is too late to prevent a write access to the retry counter by cutting off the power.

A problem with the defenses described above is that the non-volatile memory is stressed from the writes, and therefore these defenses will have an impact on the endurance and data retention of the non-volatile memory.

SUMMARY

A dummy write operation is disclosed that mimics an actual write operation to a memory array. In some implementations, a dummy write operation mimics an actual write operation by starting a charge pump, selecting a correct data line in the memory array, and by following the sequencing of an actual write operation. By mimicking an actual write operation, an attacker cannot use power analysis to distinguish between dummy and actual write operations. For example, PIN comparison operations would present the same or substantially the same power trace for both positive and negative comparisons, making it difficult for an attacker to determine if a retry count was written to NVM.

DETAILED DESCRIPTION

Example ICC Device

Figure 1:
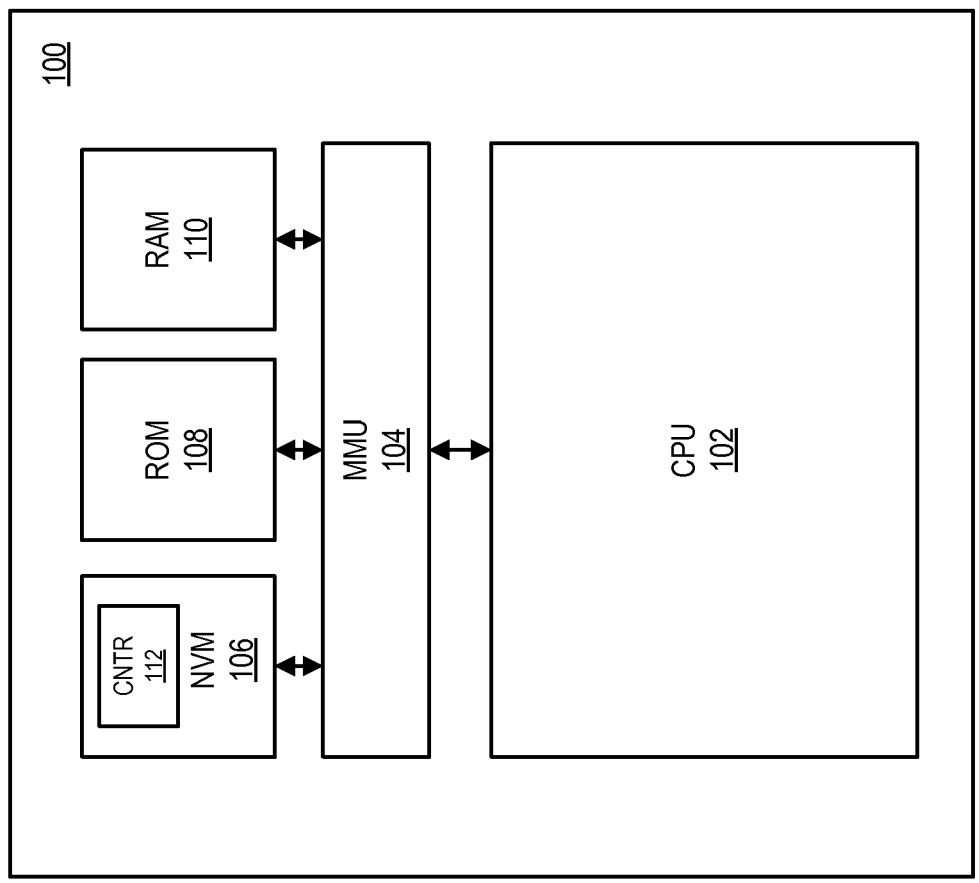
FIG. 1 is a block diagram of an example ICC device, including NVM for storing a retry count.

FIG. 1 is a block diagram of an example ICC 100, including NVM for storing a retry count. In some implementations, ICC 100 can include processor 102, memory management unit (MMU) 104, NVM device 106 (e.g., EEPROM), ROM 108 and RAM 110. NVM device 106 can store retry counter 112. In one implementation, a PIN or other secret data is input to ICC 100 and compared to a corresponding PIN or other secret data stored in ICC 100 (e.g., stored in NVM device 106). The retry counter 112 is incremented for negative comparisons and written to a reserved location in NVM 106. ROM 108 and RAM 110 can be used to cache data and instructions for execution by the processor 102.

NVM device 106 includes circuitry that is operable to mimic a write operation on a memory array in NVM device 106 without actually writing data to the memory array. Thus, a power trace of ICC 100 would fool an attacker into believing that a retry count was updated when in fact it was not. To mimic a power trace of an actual write operation, circuitry in NVM device 106 is configured for a write operation on the memory array, so that the same amount of power, or substantially the same amount of power, is consumed by NVM device 106 for the dummy write operation as would be consumed for an actual write operation.

The dummy write operation can be triggered in response to detection of an intrusion event. An intrusion event is any event that indicates an unauthorized tampering of ICC 100 or an attempt to recover or corrupt data stored on ICC 100, such as a power analysis attack. In some implementations, the detection of an intrusion event can be performed by an operating system (OS) running on processor 102. Intrusion detection can also be detected by MMU 104 or by circuitry contained within, or coupled to NVM device 106.

Example NVM Device

Figure 2:
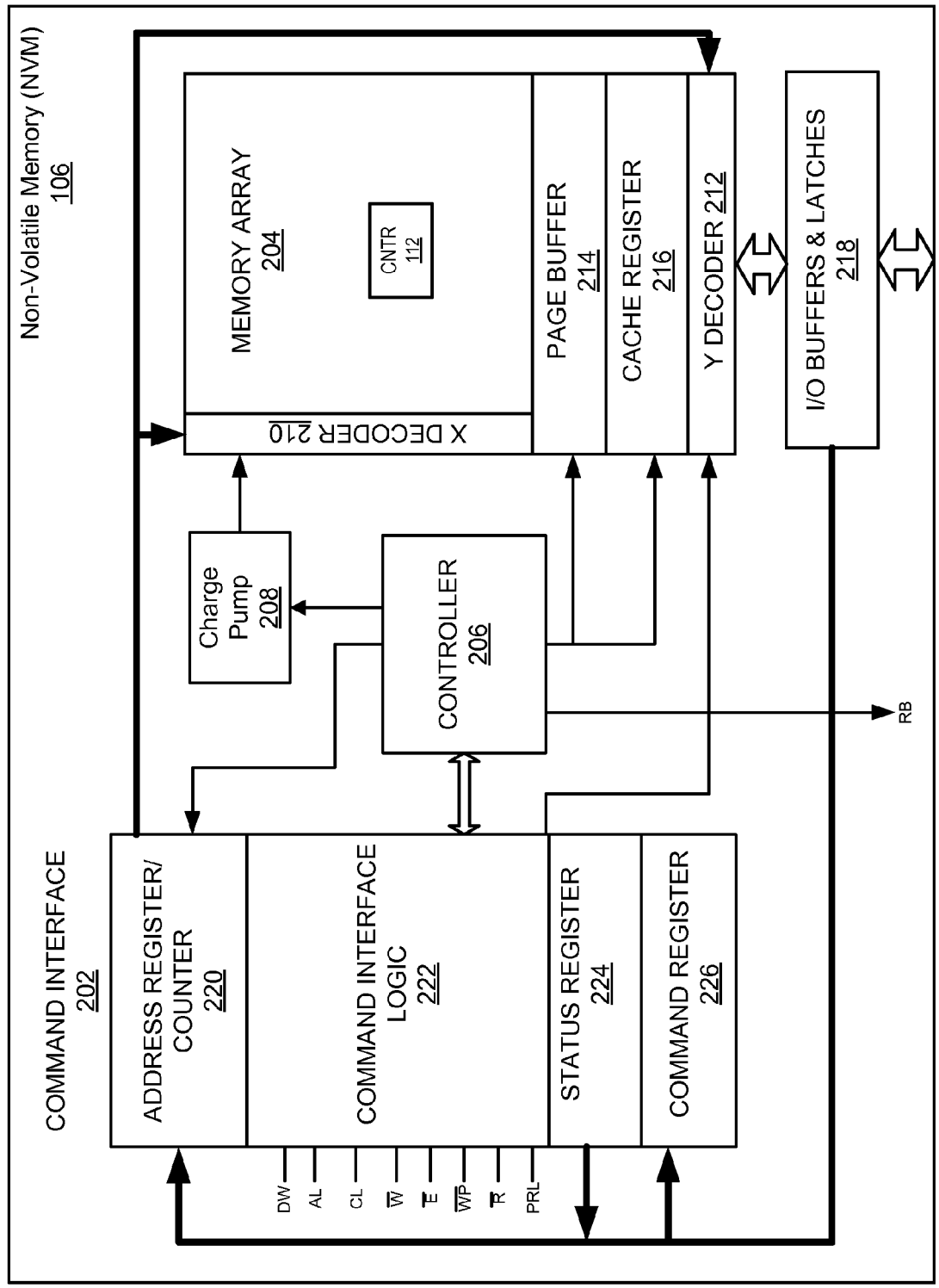
FIG. 2 is a block diagram of an example NVM device operable for implementing a dummy write operation.

FIG. 2 is a block diagram of an example NVM device 106 that is operable for implementing a dummy write operation. In some implementations, NVM device 106 can include command interface 202, memory array 204, controller 206, charge pump 208, X address decoder 210, Y address decoder 212, page buffer 214, cache register 216 and I/O buffer & latches 218. Command interface 202 can include address register/counter 220, command interface logic 222, status register 224 and command register 226. Retry counter 112 is shown stored in memory array 204. The circuitry of NVM device 106 shown in FIG. 2 is one example configuration for enabling write operations on memory array 204, including updating retry counter 112. Other configurations containing more or fewer components are also possible.

In a write operation, command register 226 receives a write command from the command interface 202 to write a page of data to a page address received in address register/counter 220. Command interface 202 can be coupled to a host processor (e.g., processor 102) through a standard bus (e.g., ATA, ONFI). In some implementations, the write command can include one or more bits which command interface logic 222 decodes to determine whether a normal write operation or a dummy write operation should be performed on memory array 204. Alternatively, one or more bits can be set in status register 224 to indicate the type of write operation to be performed. In yet another alternative implementation, a separate pin can be used for indicating a dummy write operation, thus allowing a host processor to provide a signal to NVM device 106 indicating actual or dummy write operations. The signal can be detected and/or decoded by command interface logic 222. Firmware in controller 206 can be configured based on the detected and/or decoded signal.

Regardless of the type of write operation employed, controller 206 starts charge pump 208 and configures X and Y address decoders, 210, 212 for a write operation. If an actual write operation is to be performed, then the data to be written is clocked from the I/O buffer & latches 218 into page buffer 214 where it can be programmed into memory array 204 based on the contents of address register/counter 220. In some implementations, cache register 216 can be used to cache data while an error correction process or other process is performed on the data. This could occur, for example, in a verify write operation. Controller 206 is responsible for sequencing actual and dummy write operations in the same manner, so different sequencing patterns for actual and dummy write operations cannot be detected in a power analysis attack.

If a dummy write operation is to be performed, controller 206 performs the same sequencing as an actual write operation, including starting charge pump 208 and configuring X and Y address decoders 210, 212. Controller 206 does not, however, write data to memory array 204 for a dummy write operation. For example, in some implementations controller 206 does not initiate a command to move the contents of page buffer 214 into memory array 204 even though charge pump 208 is charged and X and Y address decoders 210, 212 are configured according to the contents of address register/counter 220.

By not writing to memory array 204, the physical endurance of NVM memory array 204 can be preserved. To an outside observer (e.g., an attacker), the actual and dummy write operations are indistinguishable, even if power analysis methods are employed. In the PIN example, the attacker could not determine whether an invalid PIN or valid PIN is detected because retry counter 112 would appear to be written to memory array 204 for both positive and negative comparisons.

Example Process

Figure 3:
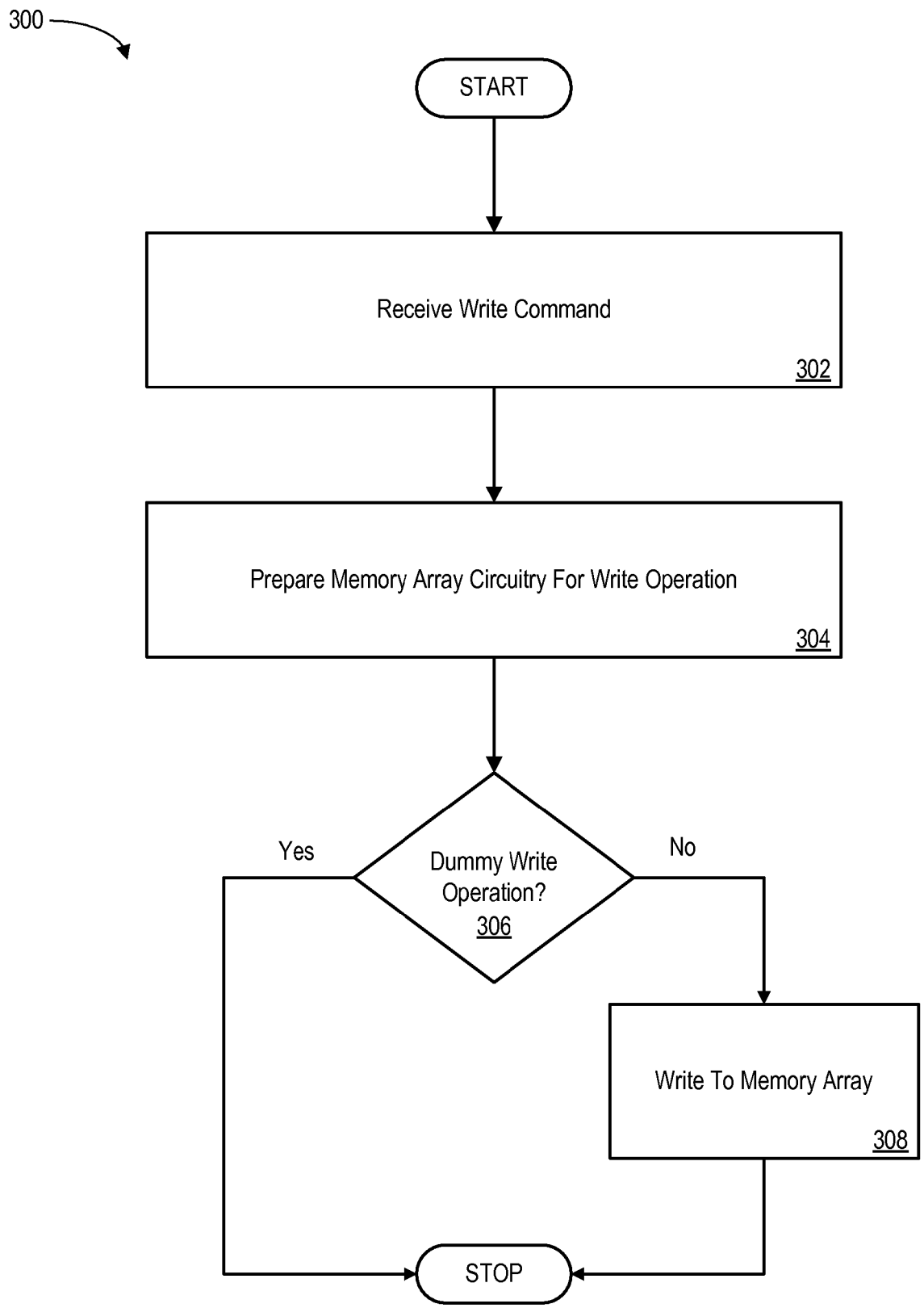
FIG. 3 is flow diagram of an example process for a dummy NVM write operation.

FIG. 3 is flow diagram of an example process 300 for a dummy write operation. In some implementations, the process 300 begins when a write command is received (302). The write command can be received from a host processor (e.g., processor 102) over a bus using a standard bus protocol for NVM systems (e.g., ATA, ONFI). In some implementations, the write command can be encoded so that the NVM device can determine whether an actual or dummy write operation should be performed. Alternatively, a signal can be received by the NVM device (e.g., received on a dedicated pin) indicating the type of write operation to be performed.

In response to the write command, circuitry for accessing a memory array in the NVM device is configured for the write operation (304), including starting a charge pump and configuring X and Y address decoders, according to the contents of address register/counter. If a dummy write operation is to be performed (306), then the process 300 ends without writing to the memory array, but still mimics the NVM write operation sequencing or timing. Otherwise, the data is written to the memory array (308).

In some implementations, the dummy write operation is performed only if an intrusion event has been detected (e.g., an intrusion, attack, data corruption). The intrusion event can be detected by an OS running on a host processor or by other software or circuitry. For example, if the OS detects an intrusion event, then the host processor can start issuing dummy write commands in place of actual write commands. In some implementations, the most significant bit of the write command can be used to indicate the type of write operation: "1" for dummy write operation and "0" for actual write operation. In other implementations, the host processor generates a signal which indicates a type of write operation to be performed on the memory array.

What is claimed is:

1. A method of performing a dummy write operation on non-volatile memory, comprising:
   receiving a write command;
   configuring circuitry for accessing the non-volatile memory for a write operation;
   determining a type of write operation to be performed on the non-volatile memory;
   if a dummy write operation is not to be performed, writing to the non-volatile memory; and
   if a dummy write operation is to be performed, not writing to the non-volatile memory.

2. The method of claim 1, further comprising:
   detecting an intrusion event; and
   encoding the write command to indicate a dummy write operation.

3. The method of claim 1, where preparing circuitry includes starting a charge pump.

4. The method of claim 1, where preparing circuitry includes selecting one or more data lines.

5. The method of claim 4, where selecting one or more data lines includes configuring one or more address decoders.

6. The method of claim 1, where preparing circuitry includes performing a sequence of tasks to prepare the non-volatile memory for either a dummy write operation or an actual write operation, the sequence of tasks being substantially the same sequence of tasks whether for a dummy write operation or an actual write operation.

7. An integrated circuit device, comprising:
   a non-volatile memory array; and
   circuitry coupled to the non-volatile memory array for:
      receiving a write command;
      configuring circuitry for accessing the non-volatile memory for a write operation;
      determining a type of write operation to be performed on the non-volatile memory array;
      if a dummy write operation is not to be performed, writing to the non-volatile memory array; and
      if a dummy write operation is to be performed, not writing to the non-volatile memory array.

8. The device of claim 7, where the circuitry includes a charge pump.

9. The device of claim 7, where the circuitry includes one or more decoders for selecting one or more data lines of the non-volatile memory.

* * * * *